(12) United States Patent
Rockwell

(10) Patent No.: US 6,947,726 B2
(45) Date of Patent: Sep. 20, 2005

(54) NETWORK SECURITY ARCHITECTURE FOR A MOBILE NETWORK PLATFORM

(75) Inventor: Laurence I. Rockwell, Redmond, WA (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 09/992,377

(22) Filed: Nov. 19, 2001

(65) Prior Publication Data
US 2003/0027551 A1 Feb. 6, 2003

Related U.S. Application Data (60) Provisional application No. 60/309,844, filed on Aug. 3, 2001.

(51) Int. Cl.$^7$ ............................ H04M 3/16; G06F 12/14
(52) U.S. Cl. ........................................ 455/411; 713/201
(58) Field of Search ................................ 455/410, 411, 455/431, 404.1, 404.2, 414.1; 340/945, 541; 709/223, 224, 225; 713/200, 201, 153, 154, 164

(56) References Cited

U.S. PATENT DOCUMENTS

| | | | |
|---|---|---|---|
| 4,774,514 A | 9/1988 | Hildebrandt | 340/977 |
| 4,825,457 A | 4/1989 | Lebowitz | 379/40 |
| 4,868,859 A | 9/1989 | Sheffer | 455/404.1 |
| 5,027,383 A | 6/1991 | Sheffer | 455/404.1 |
| 5,055,851 A | 10/1991 | Sheffer | 342/457 |
| 5,537,460 A | 7/1996 | Holliday, Jr. et al. | 455/435.1 |
| 5,866,888 A | 2/1999 | Bravman et al. | 235/375 |
| 5,905,859 A | 5/1999 | Holloway et al. | 713/201 |
| 5,917,405 A | 6/1999 | Joao | 340/426.17 |
| 5,974,149 A * | 10/1999 | Leppek | 713/201 |
| 5,991,881 A * | 11/1999 | Conklin et al. | 713/201 |
| 6,014,381 A | 1/2000 | Troxel et al. | 370/466 |

(Continued)

FOREIGN PATENT DOCUMENTS

| | | | | |
|---|---|---|---|---|
| WO | 96/13920 | * | 5/1996 | H04L/9/32 |
| WO | 99/57625 | | 11/1999 | G06F/1/00 |

OTHER PUBLICATIONS

"An Introduction to Intrusion Detection Assessment for System and Network Security Management, Passage", 1998, pp. 1–38.

*Primary Examiner*—Rafael Perez-Gutierrez
(74) *Attorney, Agent, or Firm*—Harness Dickey & Pierce P.L.C.

(57) ABSTRACT

A mobile platform security architecture is provided for monitoring security activities associated with a network residing on an aircraft. The security architecture includes a plurality of passenger connections to the network, such that each of the passenger connections has an enforced network address and is disposed in proximate location to a passenger seating area; an intrusion detection system connected to the network and operable to detect a security intrusion event whose origination is associated with network; and an airborne security manager connected to the network and adapted to receive the security intrusion event from the intrusion detection system. The security architecture is further operable to perform a security response in accordance with a security policy, where the security response is directed to at least one of the passenger connections.

6 Claims, 6 Drawing Sheets

U.S. PATENT DOCUMENTS

| | | |
|---|---|---|
| 6,052,604 A | 4/2000 | Bishop, Jr. et al. .......... 455/558 |
| 6,072,875 A * | 6/2000 | Tsudik ........................ 455/410 |
| 6,092,008 A | 7/2000 | Bateman ....................... 701/14 |
| 6,177,887 B1 | 1/2001 | Jerome ........................ 725/76 |
| 6,392,692 B1 * | 5/2002 | Monroe ....................... 455/431 |
| 6,408,391 B1 * | 6/2002 | Huff et al. .................. 713/201 |
| 6,466,779 B1 * | 10/2002 | Moles et al. ................. 455/410 |
| 6,725,378 B1 * | 4/2004 | Schuba et al. ............... 713/201 |
| 2002/0023227 A1 * | 2/2002 | Sheymov et al. ........... 713/201 |
| 2002/0048268 A1 * | 4/2002 | Menon et al. .............. 370/349 |
| 2002/0082886 A1 * | 6/2002 | Manganaris et al. ............ 705/7 |
| 2002/0133721 A1 * | 9/2002 | Adjaoute .................... 713/201 |
| 2003/0027550 A1 * | 2/2003 | Rockwell .................... 455/410 |
| 2003/0027551 A1 * | 2/2003 | Rockwell .................... 455/410 |
| 2003/0084318 A1 * | 5/2003 | Schertz ...................... 713/200 |
| 2003/0084322 A1 * | 5/2003 | Schertz et al. .............. 713/200 |
| 2003/0084323 A1 * | 5/2003 | Gales ........................ 713/200 |
| 2003/0084340 A1 * | 5/2003 | Schertz et al. .............. 713/201 |
| 2003/0135749 A1 * | 7/2003 | Gales et al. ................ 713/200 |
| 2003/0159060 A1 * | 8/2003 | Gales et al. ................ 713/200 |

* cited by examiner

NETWORK SECURITY ARCHITECTURE FOR A MOBILE NETWORK PLATFORM

This application claims priority under 35 U.S.C. §119(e) to U.S. Provisional Application No. 60/309,844 filed on Aug. 3, 2001, and entitled "Network Security Architecture For a Mobile Network Platform" the specification and drawings of which are hereby expressly incorporated by reference.

TECHNICAL FIELD

The present invention relates generally to a network security architecture for monitoring security activities in a mobile network platform, and more particularly to a mobile platform security architecture for directing security response activities to a particular user access point having an enforced network address.

BACKGROUND OF THE INVENTION

Broadband data and video services, on which our society and economy have grown to depend, have heretofore generally not been readily available to users onboard mobile network platforms such as aircraft, ships, trains, automobiles, etc. While the technology exists to deliver such services to most forms of mobile network platforms, past solutions have been generally quite expensive, with low data rates and/or available to only very limited markets of government/military users and some high-end maritime markets (i.e., cruise ships).

Previously developed systems which have attempted to provide data and video services to mobile network platforms have done so with only limited success. One major obstacle has been the high cost of access to such broadband data and video services. Another problem is the limited capacity of previously developed systems, which is insufficient for mobile network platforms carrying dozens, or even hundreds, of passengers who each may be simultaneously requesting different channels of programming or different data services. Furthermore, presently existing systems are generally not readily scalable to address the demands of the traveling public.

Of particular interest, presently existing systems also have not comprehensively addressed security issues relating to the mobile network platform. Therefore, it is desirable to provide a network security architecture for monitoring, reporting and responding to onboard security activities in a mobile network platform. It is envisioned that such a network security architecture should be designed to (a) secure computing resources to which passengers may have access on the mobile platform; (b) communicate reliably with terrestrial-based system components over an unreliable communication link; (c) provide a policy mediated response to detected security intrusion events occurring on the mobile platform; and (d) scale the management of the system to hundreds or thousands of mobile platforms.

SUMMARY OF THE INVENTION

In accordance with the present invention, a mobile platform security architecture is provided for monitoring security activities associated with a network residing on an aircraft. The security architecture includes a plurality of passenger connections to the network, such that each of the passenger connections have an enforced network address and are disposed in proximate location to a passenger seating area; an intrusion detection system connected to the network and operable to detect a security intrusion event whose origination is associated with the network; and an airborne security manager connected to the network and adapted to receive the security intrusion event from the intrusion detection system. The security architecture is further operable to command a security response in accordance with a security policy, such that the security response is directed to a security response actuator capable of disabling at least one of the passenger connections.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
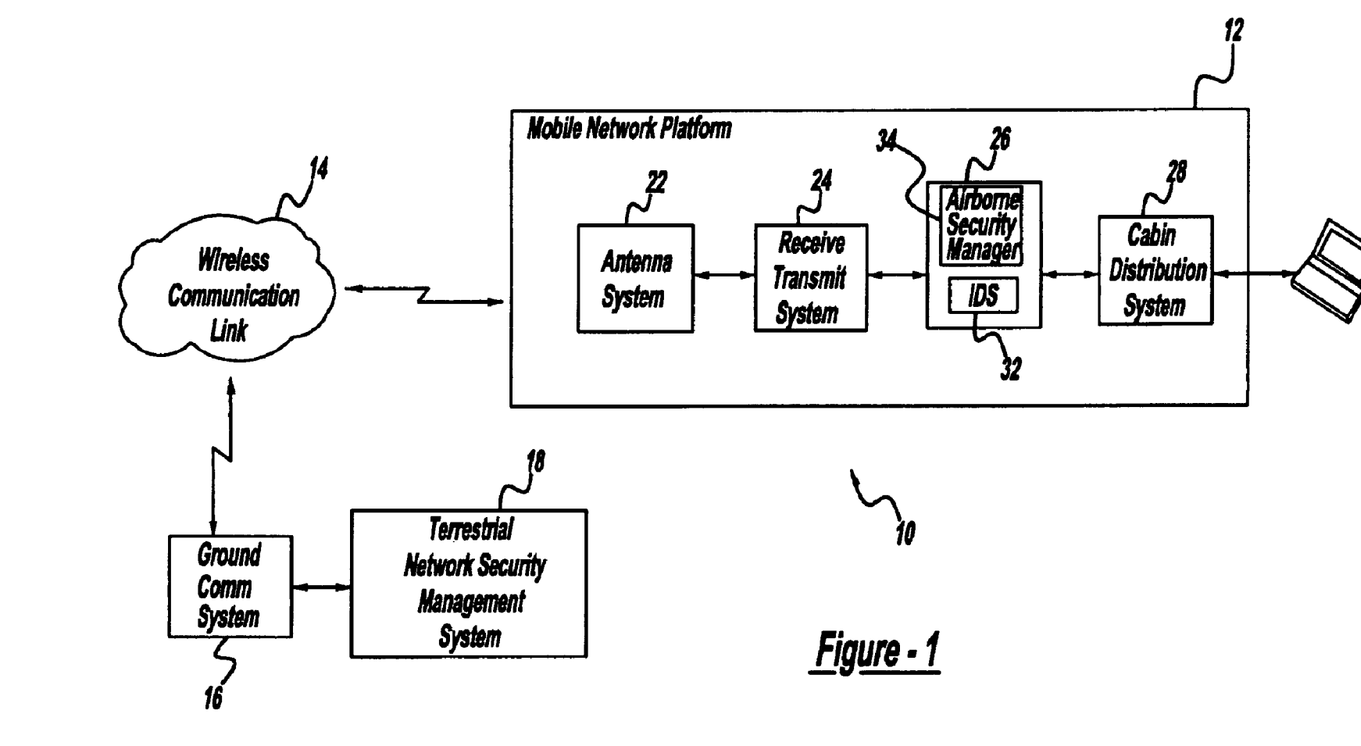
FIG. 1 is a block diagram depicting a network security architecture for a mobile network platform in accordance with the present invention.

FIG. 1 illustrates a network security architecture 10 for monitoring security activities in an unattended mobile network platform 12. The primary purpose of the network security architecture 10 is to monitor, record, report and respond to security-relevant events associated with the mobile network platform 12. In a preferred embodiment, the network security architecture 10 supports a mobile network platform residing in an aircraft. The mobile network platform 12 is in turn interconnected via one or more wireless communication links 14 to a terrestrial-based communication system 16, including a terrestrial-based network security management system 18. While the following description is provide with reference to an airborne application, it is readily understood that the broad aspects of the network security architecture are applicable to mobile network platforms which may reside in passenger buses, cruise ships, etc.

It is envisioned that the mobile network platform 12 provides aircraft passengers a suite of broadband two-way data and video communication services. The infrastructure allows information to be transferred to and from the aircraft at high enough data rates to support a variety of services. To do so, the mobile network platform 12 is primarily comprised of four subsystems: an antenna subsystem 22, a receive and transmit subsystem (RTS) 24, a control subsystem 26, and a cabin distribution subsystem 28. Each of these four subsystems will be further described below.

The antenna subsystem 22 provides two-way broadband data connectivity and direct broadcast television reception capability to the aircraft. Although the invention is not limited thereto, the antenna subsystem 22 is generally designed to provide this connectivity during cruise conditions (limited roll and pitch angles) of the aircraft. Connectivity with the aircraft is most commonly achieved via a K band Fixed Satellite Service (FSS) satellite, a Broadcast Satellite Service (BSS) satellites, and/or a direct broadcast television service (DBS) satellite.

For illustration purposes, additional description is provided for the processing associated with Ku band satellite broadcast signals. The antenna subsystem 22 may receive and/or transmit Ku band satellite broadcast signals. The antenna system 22 down-converts an incoming Ku-band signal, amplifies, and outputs the L-band signals to the RTS 24. The antenna system may also provide a broadband downlink capability. In this case, the antenna system 22 receives an L-band data signal from an on-aircraft modem, up-converts this signal, amplifies it and then broadcasts as a Ku band signal to selected satellite transponders.

The receive and transmit subsystem (RTS) 24 operates in receive and transmit modes. In receive mode, the RTS 24 may receive rebroadcast video signals, rebroadcast audio signals and/or IP data embedded in an L-band carrier. The RTS 24 in turn demodulates, de-spreads, decodes, and routes the received signals to the cabin distribution subsystem 28. In transmit mode, the RTS 24 sends IP data modulated into an L-band signal. The RTS 24 encodes, spreads, and modulates the signal the IP data it receives from the cabin distribution subsystem 28.

The control subsystem 26 controls the operation of the mobile security platform 12 and each of its four subsystems. Of particular interest, the control subsystem 26 is responsible for detecting security intrusion activities and responding to detected security intrusions in accordance with a security policy. The control subsystem is generally comprised of an airborne security manager 34 and an intrusion detection subsystem 32 as will be more fully explained below.

The cabin distribution subsystem (CDS) 28 provides network connectivity through a plurality of user access points to the passengers of the aircraft. In a preferred embodiment, the cabin distribution system may be composed of either a series of 802.3 Ethernet switches or 802.11X wireless access points. It should be noted that the current 802.11B standard only allows for a shared secret between all users of a wireless access point and thus is not suitable for providing the desired level of communication privacy in the passenger cabin. In contrast, next generation wireless standards, such as 802.11X (where "X" denotes a revision of 802.11 beyond "B"), will support "channelized" or individual user level encryption. It is envisioned that such wireless standards are within the scope of the present invention.

Each user access point preferably has the properties of a managed layer 3 switch. First, each user access point must enforce an association of IP address and Media Access Control (MAC) address with a particular port. This requirement is applicable to either a wired and wireless cabin environment. A second requirement for each user access point is to accept a command to shut off its access port. In the case of a wireless access device, a communication channel consisting of a particular frequency, time division or sub-frame substitutes for the physical access port. A third requirement for each user access point is to preclude passengers from eavesdropping or receiving Ethernet packets not directly addressed to them. In a wired cabin distribution system, this can be accomplished through the use of a switched Ethernet architecture. In a wireless cabin distribution system, this can be accomplished through the use of channel level encryptions specific to a particular user.

The design of a security policy mechanism is the most fundamental element of the network security architecture 10. It is envisioned that the security policy will be designed within the following design constraints. First, the security policy mechanism should map different security intrusion events to different responses. It should be appreciated that the severity of response is based on the danger of the detected activities. Second, the automated response policy has to be enforced at all times (subject to over-ride conditions), regardless of whether airborne to terrestrial communications are available or not. If the automated responses are disabled during periods of connectivity, the connectivity might fail before a security administrator has a chance to take action in which case the system reverts to the automated policy in effect prior to the override. The administrator can retract the response if they desire. Third, the policy mechanism has to arbitrate between automated responses from the airborne security manager and manual commands received from terrestrial-based security administrators. If the automated system mistakenly blocks a passenger's network access, and the terrestrial administrator overrides that action, the security policy mechanism needs to know about that action and not try to enforce the block.

Figure 2A:
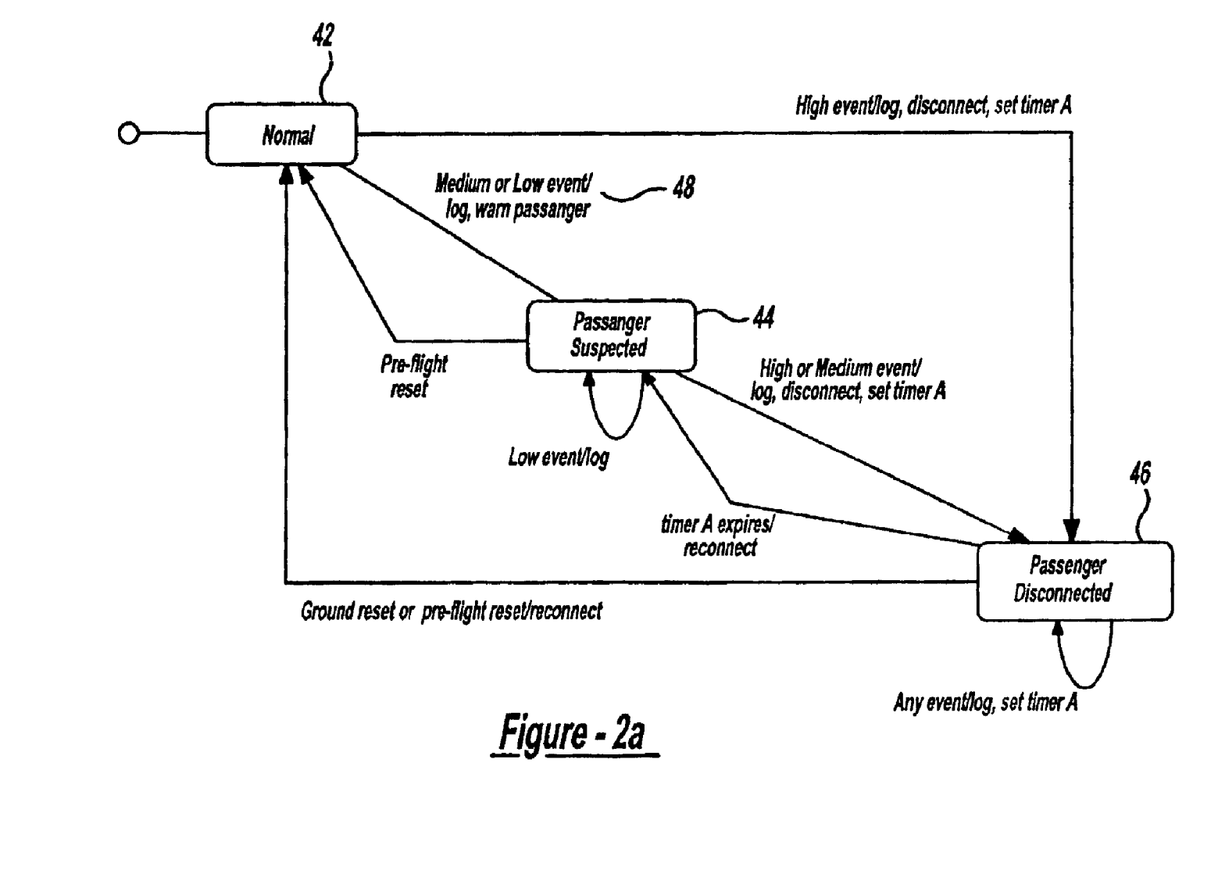
FIGS. 2A and 2B are state machine diagrams illustrating a security policy for a given user access point on the mobile network platform in accordance with the present invention.
Figure 2B:
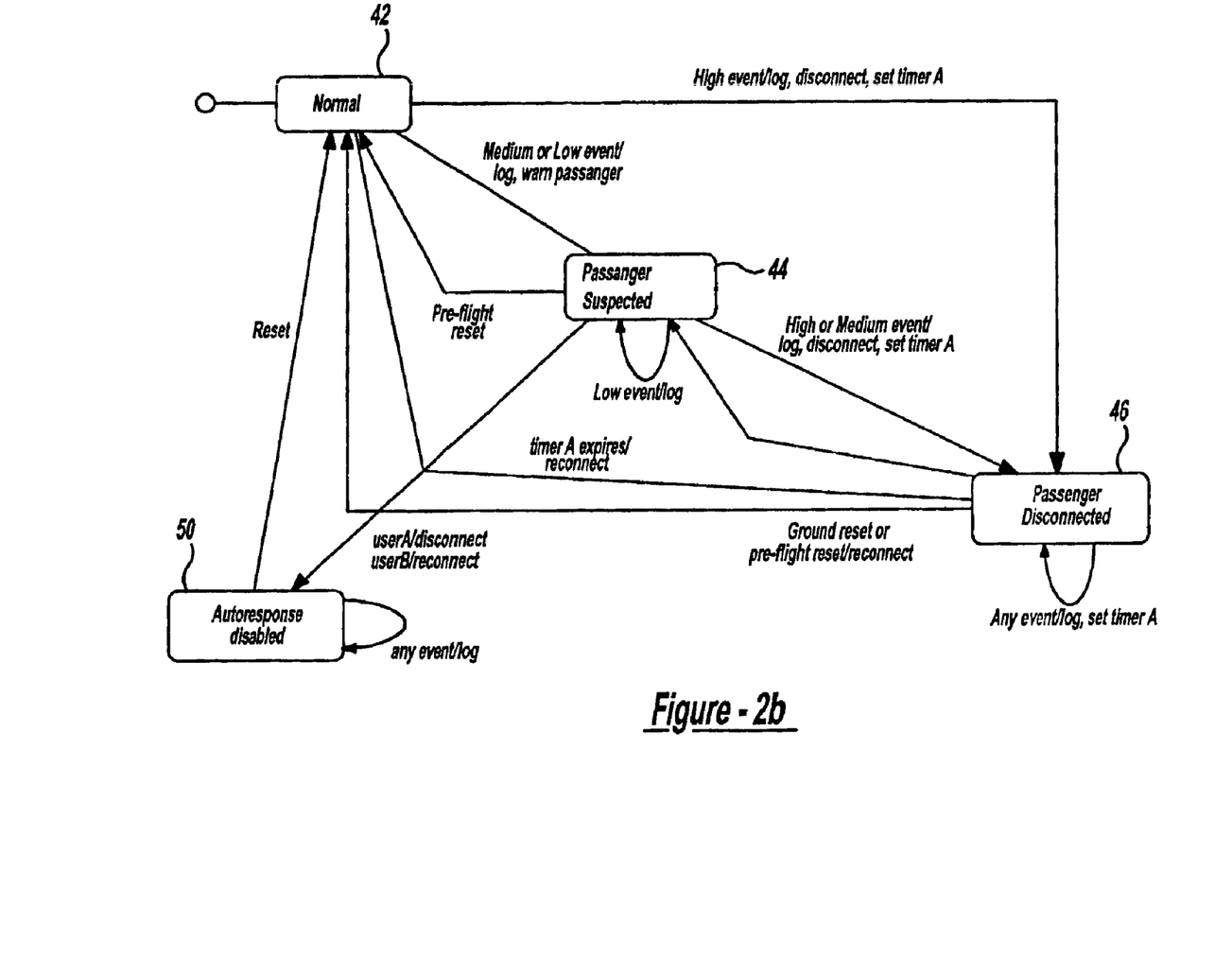

State machines are a flexible, yet intuitively appealing, mechanism for modeling complex behaviors. Therefore, state-machines have been chosen to represent the security policies of the present invention. FIGS. 2A and 2B illustrates basic UML state machines which model the security policy associated with an user access point in the mobile network platform.

In FIG. 2A, each user access point can be in one of three defined states. By default, all user access points begin in a normal state 42. A security intrusion event of any kind will result in a transition to either a suspected state 44 or a disconnected state 46 for the applicable user access point. Each transition is in the form of "event/response" where events are the external triggers that cause the state transition and responses are external actions that the system initiates when making the transition. For instance, a low or medium priority event 48 occurring in a normal state will cause the system to log the event and/or attempt to provide a warning to the passenger connected at that user access point. The user access point then transitions to the suspected state as shown in FIG. 2A.

State machine models may be enhanced to incorporate manual controls. Specific manual control commands enable a terrestrial-based security administrator to explicitly disable or enable a user access point from the ground. By adding a state that indicates that the user access point is under manual control ensures that the automated responses do not override the manual control command received from the security administrator. Therefore, it is envisioned that each state machine may provide an autoresponse disable state 50 as shown in FIG. 2B. Transitions to and from the autoresponse disable state are commanded by a terrestrially-based security administrator. While in the autoresponse disable state, the administrator can initiate any one of various predefined security responses. In the event connectivity is lost between the administrator and the aircraft, the state machine model reverts to the normal state or the previous state depending on configuration settings.

State machines models are also used to represent each of the host servers or other types of computing devices which reside on the mobile security platform. In this way, a server that is under attack may respond differently than a user access point. It is also envisioned that each of the state machines can be tied together through synthetic event generation, such that when a server is under attack, the user access points may employ a different security policy that is less tolerant of suspicious behavior.

Figure 3:
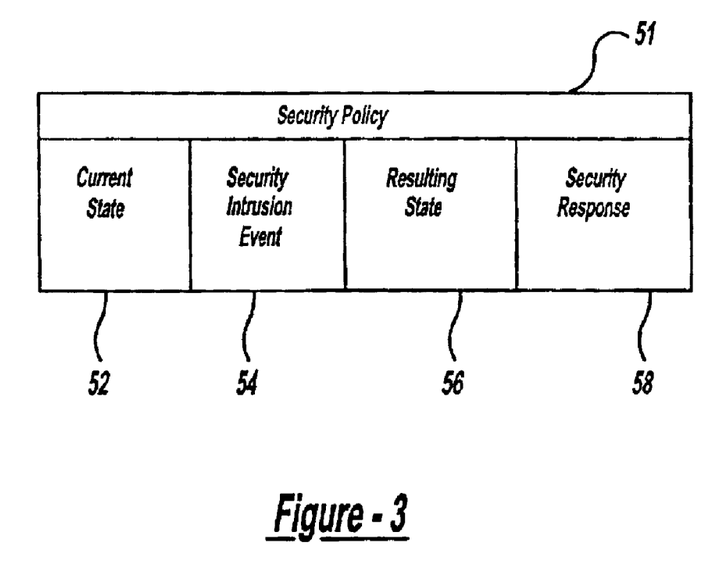
FIG. 3 is a diagram of an exemplary data structure for implementing the security policies of the present invention.

Each state machine can be represented by a data structure 51 as depicted in FIG. 3. The data structure includes a current state 52, a possible security event 54, a resulting state 56 and a possible response 58. In this way, each state can be cross-referenced against possible events to produce a resulting state and a list of possible actions. Possible events may include (but are not limited to) a security intrusion event having high priority, a security intrusion event having medium priority, a security intrusion event having a low priority, a reset event, a timer expiration event, a communication link up event, a communication link down event and one or more custom events for supporting manual control commands from the security administrator. Possible responses may include (but are not limited to) setting a timer, installing a filter, resetting a filter, alerting control panel, alerting terrestrial-based security administrator, disconnecting user access point, issuing a passenger warning, and one or more predefined customer responses. One skilled in the art will readily recognize from such discussion how to implement a security policy mechanism in accordance with the present invention.

Figure 4:
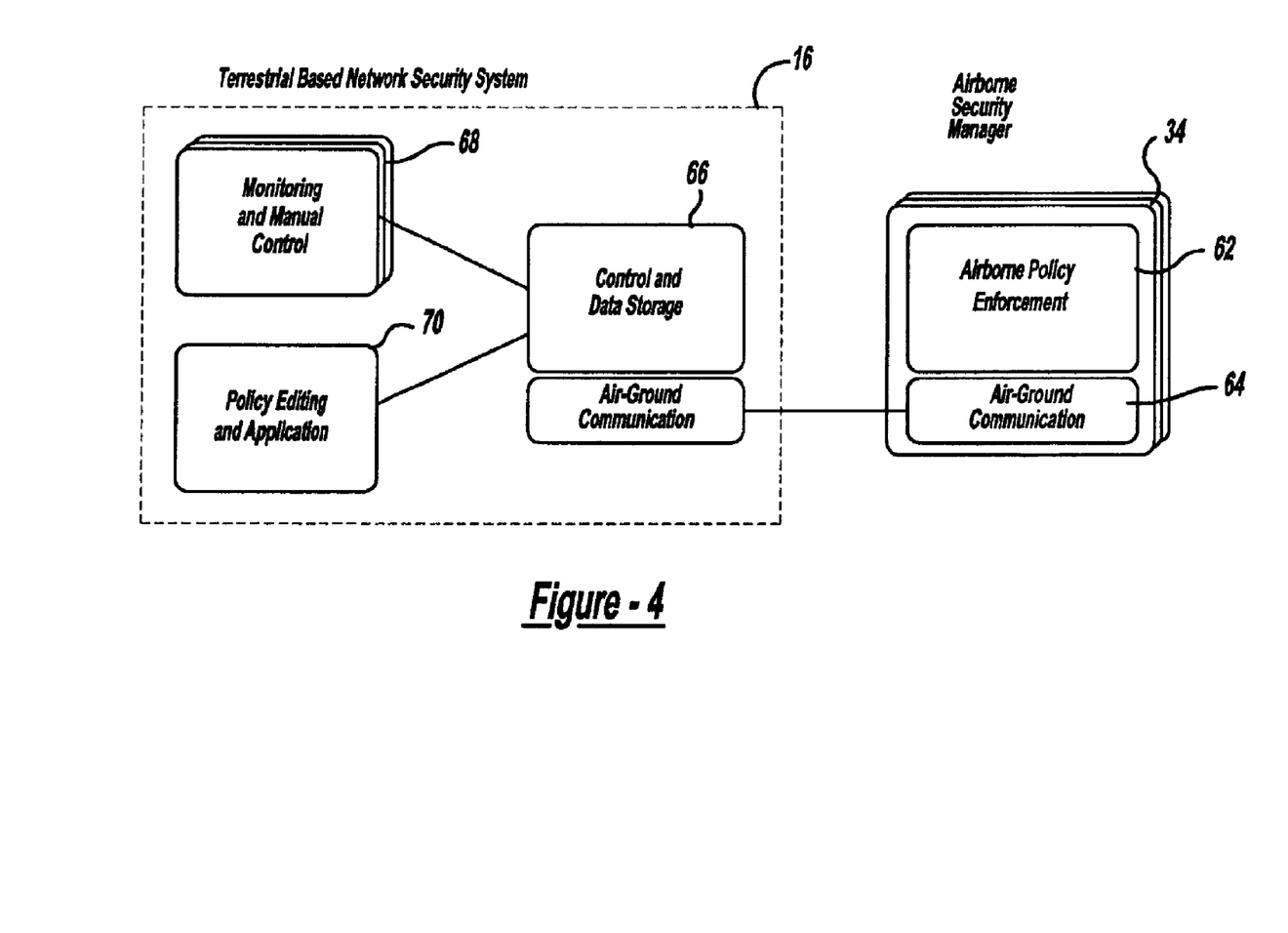
FIG. 4 is a diagram depicting the primary software components of the overall network security architecture of the present invention.

The overall network security architecture 10 may be logically decomposed into five major components as depicted in FIG. 4. The five major components are airborne policy enforcement 62, air-ground communication 64, terrestrial control and data storage 66, terrestrial monitoring and manual control 68, and terrestrial policy editing and assignment 70. Each of these logical components are also mapped to their physical location within the network security architecture 10 as shown in FIG. 4.

The airborne policy enforcement component 62 is provided by the airborne security manager 34. The primary responsibilities of the airborne security manager include (but are not limited to) managing and monitoring intrusion detection sensors, monitoring other airborne event sources, responding to security events in accordance with the applicable security policy, monitoring the airborne intrusion detection sensors, configuring static network traffic filters at user access points, executing any manual overrides commands from the terrestrial-based network security management system, installing new security policies received from the terrestrial-based network security management system, and reporting events and status of interest to the terrestrial-based network security management system. As will be apparent to one skilled in the art, the airborne security manager 34 is comprised of one or more software applications residing on one or more server(s) on each aircraft. A configuration of redundant airborne security managers provide for fail over in the event of a hardware or software failure.

The terrestrial control and data storage component 66 is provided by the terrestrial-based network security management system 16. The control and data storage control functions include (but are not limited to) storing all event data in persistent storage, tracking the desired and last known configurations for each aircraft, supporting multiple security management consoles having multiple windows, notifying open console windows of any data changes that affect the window contents, providing an interface for effecting manual overrides in security policy, offering a reporting interface for reviewing stored data, and controlling access to all stored data. This component may be implemented using Java-based applications residing on one or more terrestrial servers which constitute the network security management system 16.

The air-ground communication component 64 is responsible for communication between the airborne security manager and the terrestrial servers. Thus, this component is distributed across these two physical locations. The air-ground communication functions include (but are not limited to) providing non-blocking communications, retrying transmissions until reliable delivery is achieved, queuing up messages during periods of non-connectivity, handling communication session authentication, utilizing cryptographic integrity checks to protect against tampering and replay, optimizing away redundant or superseded messages where possible, utilizing available bandwidth according to message priorities, minimizing bandwidth consumption, and delivering security policy updates to aircrafts. Logically isolating the communications component helps protect the design of the airborne security manager and the terrestrial servers from unnecessary complexity arising from sporadic connectivity.

The terrestrial monitoring and manual control component 68 and the terrestrial policy editing and assignment component 70 also reside at the terrestrial-based network security management system 12. The monitoring and manual control component functions include (but are not limited to) monitoring the state and activities of a group of aircraft and selecting an individual aircraft for closing examination, monitoring the state and activities of a single aircraft and selecting an individual server or passenger connection for closer examination, monitoring the state and activities of a single airborne server, manually controlling a single airborne server, monitoring the state and activities of a single airborne passenger connection, and manually controlling a single airborne passenger connection.

In addition to monitoring and manual control, services for editing security policy files and distributing security policy updates also reside at the terrestrial-based network security management system 16. The policy editing and application functions include (but are not limited to) editing sensor configuration files, retrieving intrusion detection signature file updates from the applicable vendor website, editing response policy state machines and parameters, editing static security configurations, combining sensor files, signature files, response policies, and static configuration into specific security policies, providing version control over security policy updates, browsing the aircraft in the system by last known policy and desired policy, and distributing a new policy to a selected group of aircraft. The editing of security policy is not intended to be a routine daily activity. For this reason, policy editing and application functions are treated as a separate, distinct logical component from the other functions administered through the user interface running on the terrestrial servers.

Each of these components may be implemented using a Java-based user interface running on one or more terrestrial servers. The user interface further includes a number of windows that may be monitored by a human network security administrator.

Figure 5:
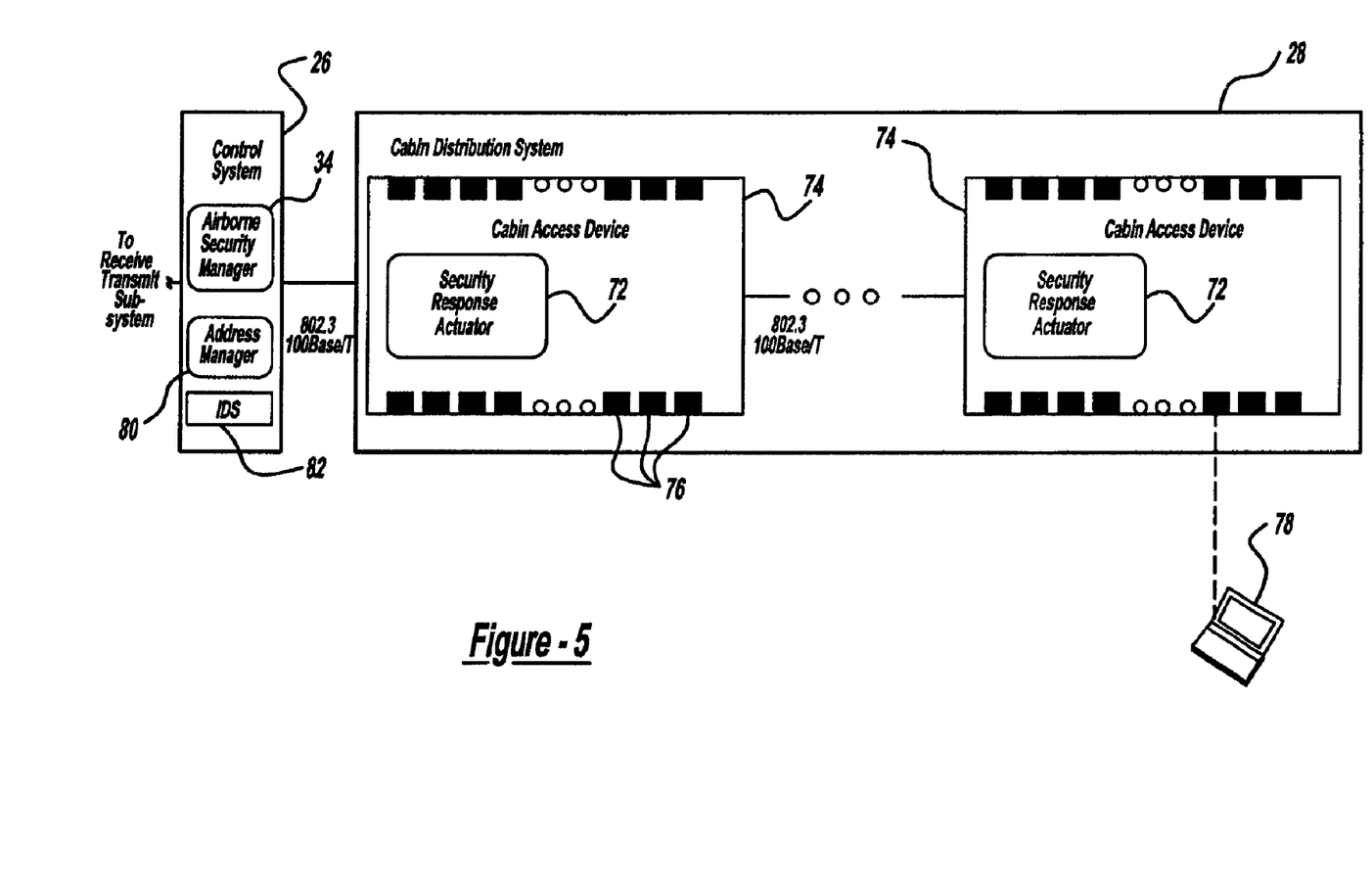
FIG. 5 is a diagram depicting the functional software modules used to direct security response to a particular user access point on the mobile security platform in accordance with the present invention.

Referring to FIG. 5, the network security architecture of the present invention is operable to direct a security response to a particular user access point on the mobile network platform. To do so, the control subsystem 26 interacts with a security response actuator 72 resident on each cabin access device 74. The security response actuator 72 in turn interfaces with one or more user access points 76 associated with the cabin access device 74. The security response actuator 72 may be any simple mechanism used to receive user port shut-off requests from the airborne security manager 34 which in turn causes the port to deny access to the attached user. These commands could be implemented via use of the Simple Network Management Protocol. It is envisioned that the cabin distribution system is composed of one or more cabin access devices 74 as shown in FIG. 5. A cabin access device may be implemented as a switched Ethernet port or a wireless access point, using commonly available RJ45 connectors.

More specifically, the security response actuator 72 is a software-implemented module that mediates passenger access to the system. When a passenger connects a computing device 78 to one of the user access points 76 provided by the cabin distribution system 28, the security response actuator 72 initiates a session with the control subsystem 26. Upon initiation of a session, an address manager 80 assigns an IP address to the passenger connection. The address manager 80 is a software or firmware function which assigns a unique IP address. It is envisioned that the IP address may be for onboard use only or may be a routable IP address for off board access.

The security response actuator 72 records the association between the IP address assigned to that passenger connection and the physical port to which the passenger's computing device is connected to in the cabin distribution system 28. Data packets pass to and from a user access point 76 via the security response actuator 72. The security response actuator 72 is further operable to pass data packets that have an assigned IP address to the user access point having the corresponding source address as well as drop data packets that do not have the assigned IP address for the intended user access point. The security response actuator 72 terminates a session when a passenger disconnects their computing device from the cabin distribution system 28.

The control subsystem 26 further includes an intrusion detection subsystem 82. The intrusion detection subsystem 82 is operable to detect security intrusion activities which may occur on or in relation to the mobile network platform. To do so, an intrusion detection subsystem 82 inspects all of the data packets entering a computing device on which it is hosted and, upon detection of a security intrusion activity, transmits a security intrusion event to the airborne security manager 34. It is envisioned that the security intrusion event will encapsulate one or more IP addresses, where each IP address correlates to a network connection affiliated with the security intrusion event. As will be apparent to one skilled in the art, the intrusion detection subsystem 82 may be implemented using one of many commercially available software products.

The airborne security manager 34 is responsible for enforcing security policy on the mobile network platform. Because communication with the aircraft may be sporadic, the airborne security manager 34 must provide the capability to act autonomously when responding to security intrusion events. When a security intrusion event is detected, the airborne security manager 34 responds appropriately in accordance with a customizable security policy. Thus, the airborne security manager 34 is adapted to receive security intrusion events from any of the intrusion detection subsystems and operable to implement a security response. Exemplary responses may include warnings one or more passengers on the aircraft, alerting terrestrial-based security administrators, and/or disconnecting a passenger's network access.

Of particular interest, the airborne security manager, in conjunction with the security response actuator, are able to direct security responses to a particular user access point. For instance, the airborne security manager may issue a disable port command to the security response actuator. The disable port command includes an IP address for the intended used access point. Upon receipt of the disable command, the security response actuator no longer accepts data packets from the physical port associated with the IP address. A similar mechanism may be used to enable a previously disabled user access point. One skilled in the art will readily recognize that other security response commands may be similarly directed via the security response actuator to a particular user access point.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A network security architecture for monitoring security activities in a mobile network platform, comprising:

a mobile network residing on the mobile network platform, the mobile network includes a plurality of user access points;

an address manager residing on the mobile network platform and operable to dynamically assign a network address to any one of the plurality of the user access points;

a security response actuator associated with each of the plurality of user access points, each security response actuator is operable to enforce an association of a network address with an assigned user access point;

an intrusion detection system connected to the mobile network and residing on the mobile network platform, the intrusion detection system operable to detect a security intrusion event that is associated with a first user access point from the plurality of user access points; and a mobile security manager residing on the mobile network platform, the mobile security manager is adapted to receive the security intrusion event from the intrusion detection system and operable to issue a security response command in response to the security intrusion event, where the security response command is directed to said first user access point.

2. The network security architecture of claim 1 wherein the security response actuator associated with the first user access point is adapted to receive the security response command from the security manager and operable to perform security response activities in response to the security response command.

3. The network security architecture of claim 2 wherein the security response actuator associated with the first user access point is operable to prevent transmission of data packets to the first user access point, where the data packets are not associated with the first user access point.

4. The network security architecture of claim 2 wherein each security response actuator enforces an association of a network address with an assigned user access point when a computing device is in data communication with the assigned user access point.

5. The network security architecture of claim 2 wherein the security response actuator associated with the first user access point is operable to prevent transmission of data packets from the first user access point.

6. A method for monitoring security activities associated with a network residing in a mobile network platform, comprising:

provide a plurality of user access points to the network;

dynamically assigning a network address to one of the plurality of the user access points and enforcing an association of the network address with said one of the plurality of assigned user access points;

detecting a security intrusion event whose origination is associated with one of the plurality of user access points; and performing a security response activity in response to the detected security intrusion event, when the security response activity is directed to said one of the plurality of user access points.

* * * * *